United States Patent
Yoo et al.

(10) Patent No.: US 9,700,788 B2
(45) Date of Patent: Jul. 11, 2017

(54) VIDEO OBJECT DETECTING APPARATUS, VIDEO OBJECT DEFORMING APPARATUS, AND METHODS THEREOF

(75) Inventors: Byung In Yoo, Seoul (KR); Chang Kyu Choi, Seongnam-si (KR); Jae Joon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 913 days.

(21) Appl. No.: 13/416,595

(22) Filed: Mar. 9, 2012

(65) Prior Publication Data
US 2012/0268609 A1    Oct. 25, 2012

(30) Foreign Application Priority Data
Apr. 22, 2011    (KR) .................. 10-2011-0037877

(51) Int. Cl.
*H04N 17/00*    (2006.01)
*A63F 13/20*    (2014.01)
(Continued)

(52) U.S. Cl.
CPC ............ *A63F 13/20* (2014.09); *A63F 13/213* (2014.09); *A63F 13/42* (2014.09); *A63F 13/655* (2014.09); *G06F 3/005* (2013.01); *G06F 3/011* (2013.01); *G06F 3/017* (2013.01); *G06K 9/00342* (2013.01); *A63F 2300/1087* (2013.01); *A63F 2300/6045* (2013.01); *A63F 2300/695* (2013.01)

(58) Field of Classification Search
CPC .............. A63F 13/10; A63F 2300/1087; A63F 2300/305; A63F 2300/6045; A63F 2300/61; A63F 2300/638; A63F 2300/8047; G06F 3/011; G06F 3/017; G06F 3/04815; G06F 3/0482; G06K 9/00342
USPC ........... 348/77, 180; 345/156; 382/154, 190; 463/8, 43; 715/863; 386/248
See application file for complete search history.

(56) References Cited

U.S. PATENT DOCUMENTS 6,459,824 B1 * 10/2002 Lee .................. G06F 17/30259
                                                                345/420
6,557,010 B1 *  4/2003 Kim ................. G06F 17/30271
(Continued)

FOREIGN PATENT DOCUMENTS

JP       2000-48044 A     2/2000
JP       2001-109894 A    4/2001
(Continued)

OTHER PUBLICATIONS

Arjun Jain, et al. "MovieReshape: Tracking and Reshaping of Humans in Videos", SIGGRAPH ASIA 2010, 9pages.
(Continued)

*Primary Examiner* — Thai Tran
*Assistant Examiner* — Stephen Smith
(74) *Attorney, Agent, or Firm* — NSIP Law (57) ABSTRACT

A video object detecting apparatus enables a user to not only simply watch the video but also to explore a video using a motion and a posture of the user. In addition, the user may manipulate the video using body motion instead of general input units such as a mouse and a touch system. Also, a video object deforming apparatus enables the user to recognize a difference in motions between an interactive video and the user, and provides the user with a video reflecting the difference.

18 Claims, 8 Drawing Sheets

(51) Int. Cl.
  *A63F 13/655* (2014.01)
  *A63F 13/213* (2014.01)
  *A63F 13/42* (2014.01)
  *G06F 3/00* (2006.01)
  *G06F 3/01* (2006.01)
  *G06K 9/00* (2006.01)

(56) References Cited

U.S. PATENT DOCUMENTS

| | | | | |
|---|---|---|---|---|
| 2009/0079813 A1* | 3/2009 | Hildreth | .................. | H04N 7/147 348/14.03 |
| 2009/0085864 A1* | 4/2009 | Kutliroff | .................. | A63F 13/10 345/156 |
| 2009/0163262 A1* | 6/2009 | Kang | .................. | A63B 24/0062 463/8 |
| 2010/0104184 A1* | 4/2010 | Bronstein | ......... | G06F 17/30784 382/170 |
| 2010/0149310 A1 | 6/2010 | Zhang et al. | | |
| 2010/0208038 A1* | 8/2010 | Kutliroff | ............ | G06K 9/00201 348/46 |
| 2010/0215271 A1* | 8/2010 | Dariush | ............. | G06K 9/00369 382/180 |
| 2010/0302138 A1* | 12/2010 | Poot | ......... | G06F 3/017 345/156 |
| 2010/0303303 A1* | 12/2010 | Shen | .................. | G06K 9/00335 382/107 |
| 2011/0021273 A1* | 1/2011 | Buckley | .................. | A63F 13/00 463/31 |
| 2011/0085734 A1* | 4/2011 | Berg | .................. | G06F 17/30802 382/195 |
| 2011/0098109 A1* | 4/2011 | Leake | .................. | A63F 13/213 463/30 |
| 2011/0157009 A1* | 6/2011 | Kim | ......... | G06F 3/017 345/156 |
| 2011/0173574 A1* | 7/2011 | Clavin | .................. | G06F 3/017 715/863 |
| 2011/0289456 A1* | 11/2011 | Reville | .................. | G06F 3/017 715/830 |
| 2011/0304632 A1* | 12/2011 | Evertt | .................. | G06F 3/011 345/474 |
| 2011/0306396 A1* | 12/2011 | Flury | .................. | A63F 13/46 463/7 |
| 2012/0040755 A1* | 2/2012 | Pryor | .................. | G06F 3/042 463/32 |
| 2012/0242800 A1* | 9/2012 | Ionescu | .................. | G06F 3/017 348/46 |
| 2013/0028491 A1* | 1/2013 | Stephenson | ........ | A63B 24/0003 382/128 |

FOREIGN PATENT DOCUMENTS

| | | |
|---|---|---|
| JP | 2007-323268 A | 12/2007 |
| JP | 2007-328459 A | 12/2007 |
| KR | 2001-0073916 | 8/2001 |
| KR | 2002-0075722 | 10/2002 |
| KR | 10-0878127 | 11/2002 |
| KR | 2003-0065620 | 8/2003 |
| KR | 10-2005-0082559 | 8/2005 |
| KR | 10-2005-0099547 A | 10/2005 |
| KR | 10-2007-0102360 | 10/2007 |
| KR | 10-2008-0083078 | 9/2008 |

OTHER PUBLICATIONS

Christian Plagemann, et al. "Real-time Identification and Localization of Body Parts from Depth Images", ICRA 2010, 6pages.

Dan B. Goldman, et al. "Video Object Annotation, Navigation, and Composition", UIST 2008, 10pages.

Xiaolin K. Wei, et al. "Intuitive Interactive Human Character Posing with Millions of Example Poses", IEEE Computer Graphics and Applications 2011, 11 pages.

Korean Office Action issued on Feb. 22, 2017 in corresponding Korean Patent Application No. 10-2011-0037877 (5 pages in Korean with English Translation).

\* cited by examiner

VIDEO OBJECT DETECTING APPARATUS, VIDEO OBJECT DEFORMING APPARATUS, AND METHODS THEREOF

CROSS-REFERENCE TO RELATED APPLICATIONS

This application claims the priority benefit of Korean Patent Application No. 10-2011-0037877, filed on Apr. 22, 2011, in the Korean Intellectual Property Office, the disclosure of which is incorporated herein by reference.

BACKGROUND

1. Field

Example embodiments of the following description relate to a video object detecting apparatus and a video object deforming apparatus, and more particularly, to apparatuses to detect and deform a video object of an interactive video.

2. Description of the Related Art

Research and development related to technology for controlling a user interface (UI) by sensing a body motion of a user is rapidly increasing. However, in general, current motion sensing technologies are limited to a graphic-based game input device or UI operator substituting a remote controller of electronic devices.

In 2007, the worldwide movie industry market measured 27,403 million dollars in terms of theater sales, 55,837 million dollars in terms of home-video sales, and 2,664 million dollars in terms of online movie sales, for a combined total sales of 85,904 million dollars. By location, the sales measured 33,717 million dollars in the U.S.A. and 22,238 million dollars in Western Europe.

The movie industry market, in terms of sales, was almost equivalent to the worldwide game market in 2007 which had total sales of 86,418 million dollars, including 35,837 million dollars in terms of arcade games, 3,042 million dollars in terms of PC games, 37,415 million dollars in terms of console games, 7,155 million dollars in terms of online games; and 2,969 million dollars in terms of mobile games. In consideration of this, it is expected that UI technology based on body motion will be actively used in controlling an interactive video as well as the graphic-based game input device. In the event that the application field expands to the music video and music broadcasting market or the health video market, the value of an interactive video control technology will further increase.

Since the graphic-based technology that represents a 2-dimensional/3-dimensional (2D/3D) object by a real-time rendering engine is convenient to produce interactive content using a new modality, such as motion sensing, motion recognition technology has been rapidly spread. However, as to video contents currently used which are implemented as scenes photographed by a 2D/3D camera and sequentially played back through post-processing such as adjusting or editing, for example, an innovative scheme for producing and appreciating an interactive video is needed to utilize video contents having modality such as a natural motion of a user.

Accordingly, the following embodiments will describe a new video object detecting and deforming apparatus for utilizing an interactive video.

SUMMARY

The example embodiments may include a video object detecting apparatus that may include an object retrieval unit to retrieve a sensing object from a sensing image related to a user, and also retrieve a video object from an interactive video, a calculation unit to calculate similarity between the sensing object and the video object, and a frame extraction unit to extract a frame having a highest similarity from the interactive video.

The video object detecting apparatus may include an object retrieval unit to retrieve a video object input by a user from an interactive video, a tracking unit to track a position of a control point for controlling the video object, a calculation unit to calculate a difference of positions between a moment of the video object and the control point, based on an identification (ID) of the video object and the position of the control point, and a frame extraction unit to extract a frame, having a lowest similarity, from the interactive video.

The example embodiments may also include a video object deforming apparatus that may include an object retrieval unit to retrieve a sensing object from a sensing image related to a user, and also retrieve a video object from an interactive video, a calculation unit to calculate a difference between an object shape related to the sensing object and a depth image related to the video object, and a generation unit to generate a difference map based on the calculated difference.

The example embodiments may also include a video object detecting method that may include retrieving a sensing object from a sensing image related to a user and also retrieving a video object from an interactive video, calculating similarity between the sensing object and the video object, and extracting a frame, having a lowest similarity, from the interactive video.

The example embodiments may also include a video object detecting method that may include retrieving a video object input by a user from an interactive video, tracking a position of a control for controlling the video object, calculating a difference of positions between a moment of the video object and the control point, based on an identification of the video object and the position of the control point, and extracting a frame having a lowest similarity from the interactive video.

The example embodiments may also include a video object deforming method that may include retrieving a sensing object from a sensing image related to a user and also retrieving a video object from an interactive video, calculating a difference between an object shape related to the sensing object and a depth image related to the video object, and generating a difference map based on the calculated difference.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Reference will now be made in detail to example embodiments, examples of which are illustrated in the accompanying drawings, wherein like reference numerals refer to like elements throughout. Example embodiments are described below to explain the present disclosure by referring to the figures.

Figure 1:
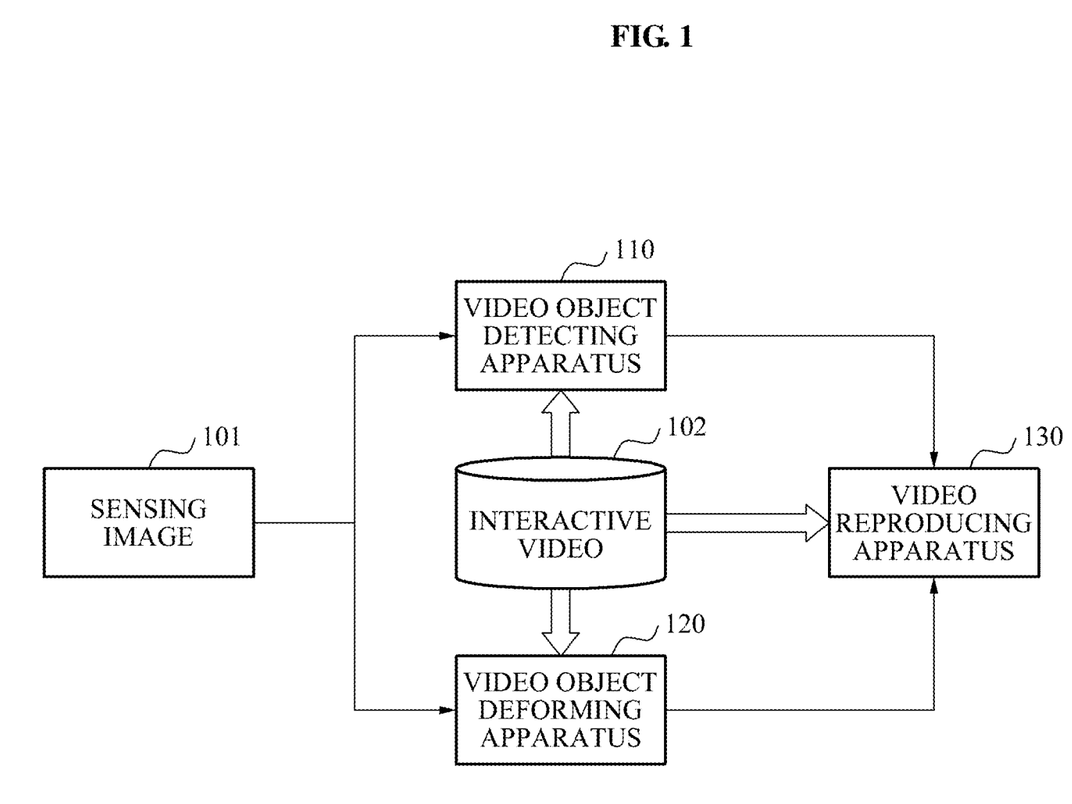
FIG. 1 illustrates an interactive video processing system according to example embodiments.

FIG. 1 illustrates an interactive video processing system according to example embodiments.

Referring to FIG. 1, the interactive video processing system includes a video object detecting apparatus 110 and a video object deforming apparatus 120.

A sensing image 101 produced by sensing a user and an interactive video 102 may be input to the video object detecting apparatus 110, and the video object detecting apparatus 110 may explore a frame including a most similar video object to a motion or posture of the user. For example, when the user is playing an interactive video about yoga and the user assumes a particular yoga posture, the video object detecting apparatus 110 according to the example embodiments may explore video frames including an object, such as a person, in a similar posture as the particular yoga posture of the user, and output the searched video frames to a video reproducing apparatus 130. Accordingly, the user may be able to search and reproduce a part from the interactive video about yoga, related to a desired motion or posture X.

As an example, the sensing image 101 may be a video image about a motion or posture of the user, taken by a sensor such as a camera and a motion sensor. Here, the sensing object may be an object representing the user in the sensing image 101.

As another example, the interactive video 102 may be an image of the object, taken by at least one of a color camera capable of taking a color image and a depth camera capable of taking a depth image. Here, the video object may be an object such as a video image of a person and a thing, included in the interactive video 102.

The interactive video 102 will be described in further detail later with reference to FIG. 2.

The video object deforming apparatus 120 according to the example embodiments may be input with the sensing image 101 and the interactive video 102, thereby generating a difference between the user and the video object or deforming the video object according to the difference. For example, when the user plays an interactive video about yoga, the video object deforming apparatus 120 may provide the user with a difference between a yoga posture of the user and a yoga posture being imitated from the interactive video, through the video reproducing apparatus 130. Therefore, the user may recognize the difference and correct his or her posture. In addition, the video object deforming apparatus 120 may deform the video object using the generated difference and provide the user with the deformed video object through the video reproducing apparatus 130.

The video object detecting apparatus 110 and the video object deforming apparatus 120 may be provided independently or compatibly.

Figure 2:
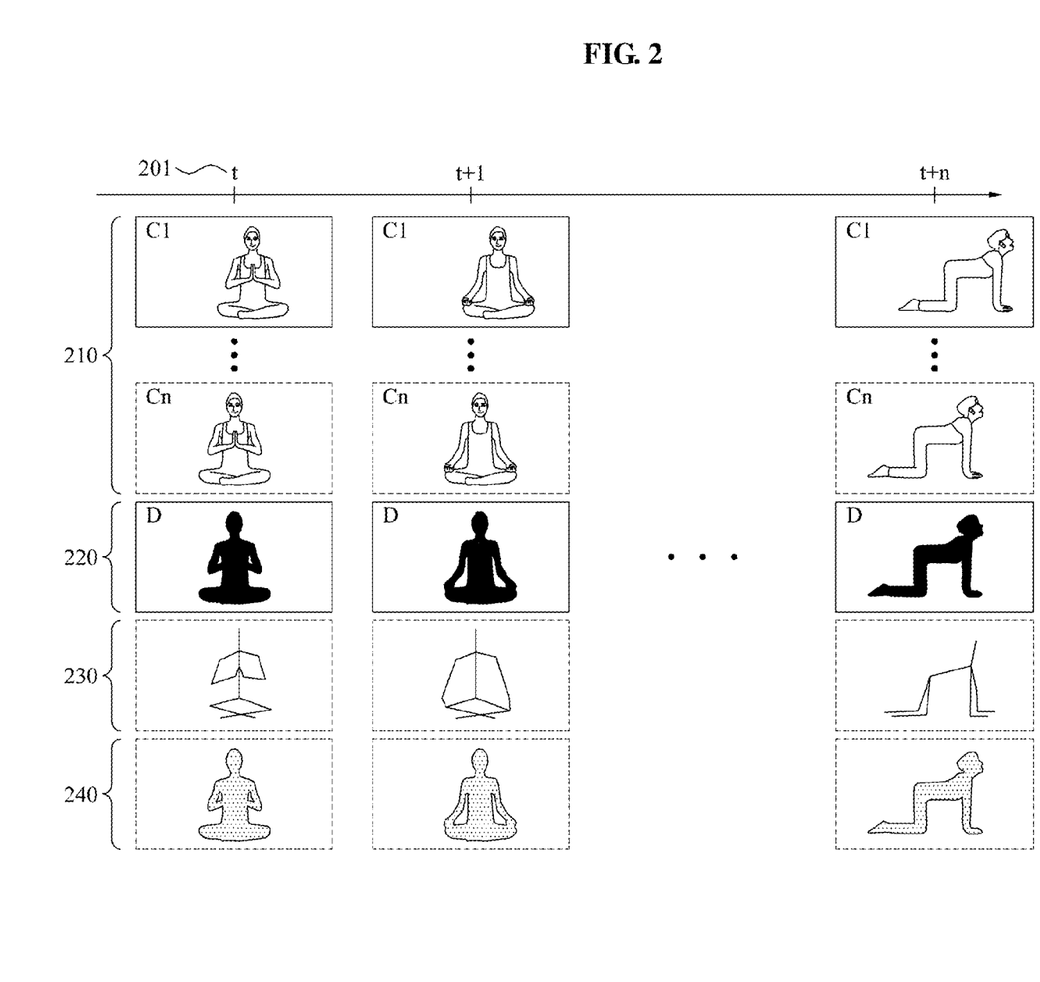
FIG. 2 illustrates an interactive video according to example embodiments.

FIG. 2 illustrates an interactive video according to example embodiments.

Referring to FIG. 2, the interactive video includes at least one color image.

For example, the interactive video may include an n-number of color images 210 including a video object, such as a person, assuming a yoga posture in a frame t 201.

According to one aspect, the interactive video may further include at least one depth image 220.

According to another aspect, the interactive video may further include at least one video object skeleton 230 representing the video object in a skeleton form.

According to yet another aspect, the interactive video may further include at least one video object shape 240 representing a shape of the video object.

Figure 3:
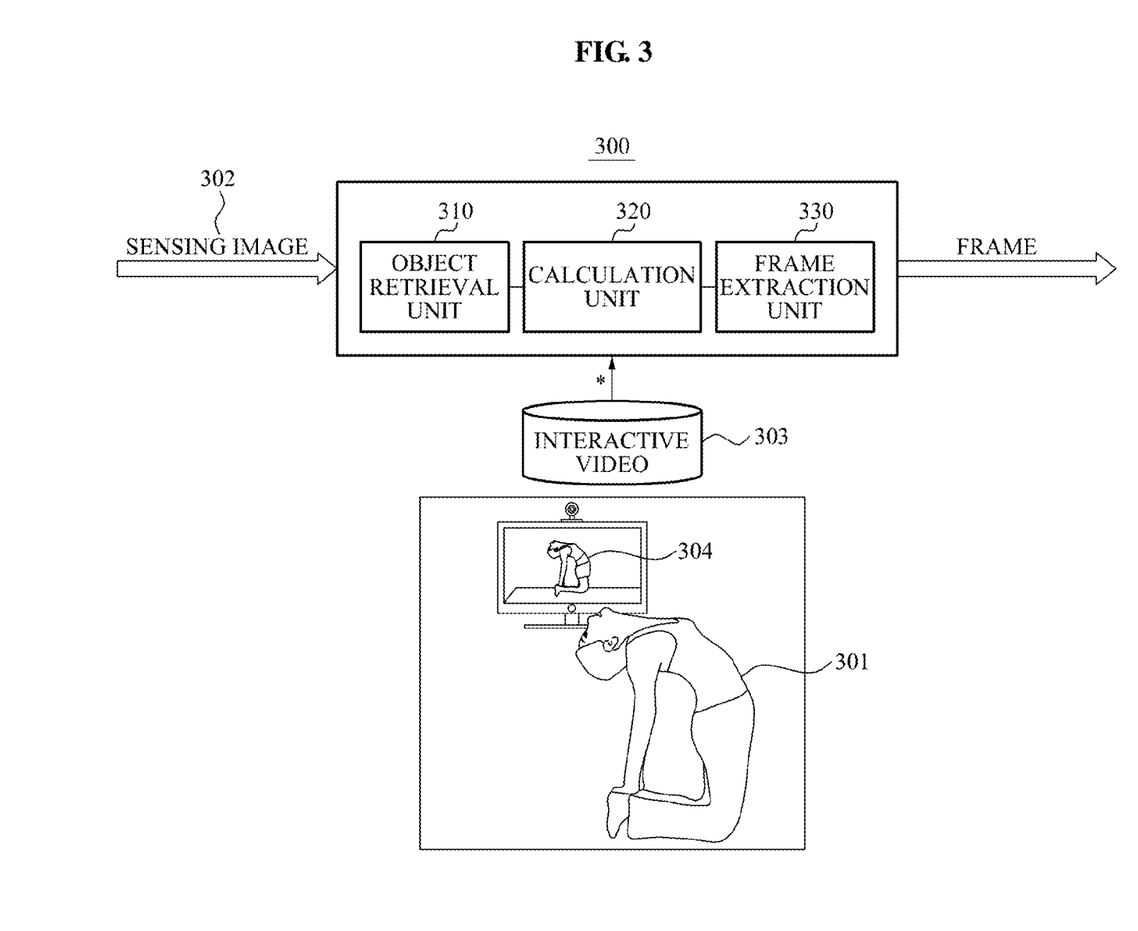
FIG. 3 illustrates a structure of a video object detecting apparatus according to example embodiments.

FIG. 3 illustrates a structure of a video object detecting apparatus 300 according to example embodiments.

Referring to FIG. 3, the video object detecting apparatus 300 may include an object retrieval unit 310, a calculation unit 320, and a frame extraction unit 330.

The object retrieval unit 310 may retrieve a sensing object from a sensing image 302 related to a user 301. That is, the object retrieval unit 310 may retrieve an object representing the user 301 from the sensing unit 302.

Depending on embodiments, the object retrieval unit 310 may retrieve the video object from the sensing image 302 by a model-based tracking method.

Depending on embodiments, the object retrieval unit 310 may retrieve the video object from the sensing image 302 as a video object skeleton in a skeleton form. Alternatively, the object retrieval unit 310 may retrieve the video object from the sensing image 302 as a sensing object shape representing a shape of the video object.

The object retrieval unit 310 may retrieve a video object from an interactive video 303. That is, the object retrieval unit 310 may retrieve an object such as a video image of a person or a thing from the interactive video 303.

Depending on embodiments, the object retrieval unit 310 may retrieve the video object from the interactive video 303 by the model-based tracking method.

Depending on embodiments, the object retrieval unit 310 may retrieve the video object as the video object skeleton in the skeleton form, from the interactive video 303. Alternatively, the object retrieval unit 310 may retrieve the video object as the video object shape representing the shape of the video object, from the interactive video 303.

The calculation unit 320 may calculate similarity between the sensing object and the video object.

The frame extraction unit 330 may extract a highest-similarity frame 304 having a highest similarity from the interactive video 303. That is, the frame extraction unit 330 may extract the highest-similarity frame 304 containing a video object most similar to the video image of the user 301 from the interactive video 303.

According to certain embodiments, the frame extraction unit 330 may output the extracted highest-similarity frame 304 to a video reproducing apparatus and the video reproducing apparatus may reproduce the extracted highest-similarity frame 304.

Hereinafter, an operation of the video object detecting apparatus 300 will be described in detail about a case where the object retrieval unit 310 retrieves the sensing object as a sensing object skeleton and retrieves the video object as a video object skeleton.

The object retrieval unit 310 may retrieve the sensing object as the sensing object skeleton from the sensing image 302.

The sensing object skeleton being retrieved may include an n-number of joints located in positions satisfying Equation 1 shown below.

$$J_{k, 1 \leq k \leq n} \qquad \text{Equation 1}$$

Additionally, the video retrieval unit 310 may retrieve the video object from the interactive video 303, as the video object skeleton.

Here, each frame t belonging to a total duration T of the interactive video 303 may be expressed as Equation 2 shown below.

$$t \in T(S_k) \qquad \text{Equation 2}$$

Here, the video object skeleton stored in each frame t of the interactive video 303 may include an n-number of joints located in positions satisfying Equation 3 shown below.

$$S_{k, 1 \leq k \leq n}(t) \qquad \text{Equation 3}$$

According to the example embodiments, the calculation unit 320 may calculate similarity between the sensing object and the video object using Equation 4 shown below.

$$D(t) = \sum_{joint=1}^{n} \|(J_n - S_n(t))\| \qquad \text{Equation 4}$$

According to Equation 5 shown below, the frame extraction unit 330 may extract a frame that minimizes a value of D(t) as shown in Equation 4 to be the highest-similarity frame 304.

$$t^* = \mathrm{argmin}_{\{t \in T(s)\}} D(t) \qquad \text{Equation 5}$$

Figure 4:
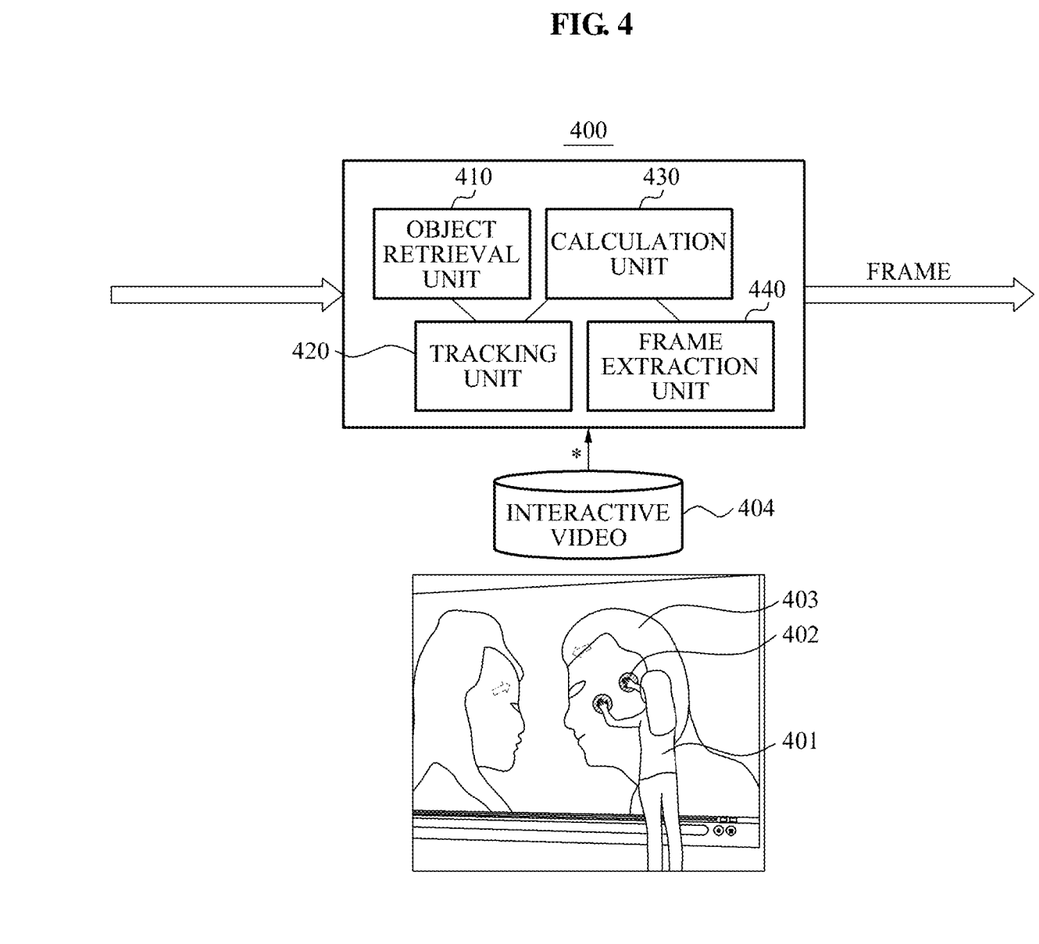
FIG. 4 illustrates a structure of a video object detecting apparatus according to other example embodiments.

FIG. 4 illustrates a structure of a video object detecting apparatus 400 according to other example embodiments.

Referring to FIG. 4, the video object detecting apparatus 400 may include an object retrieval unit 410, a tracking unit 420, a calculation unit 430, and a frame extraction unit 440.

The object retrieval unit 410 may retrieve a video object 403 from an interactive video 404. Depending on embodiments, each video object 403 may include its own identification (ID).

The tracking unit 420 may track a position of a control point 402 for controlling the video object 403 input by a user 401.

Parts of a human body, such as a hand, a face, or a foot, for example, may be set as the control point 402.

The calculation unit 430 may calculate a difference between a moment of the video object 403 and a position of the control point 402, based on the identification of the video object 403 and the position of the control point 402.

The frame extraction unit 440 may extract a frame having the smallest difference calculated from the interactive video 404.

That is, when the user 401 wants to move the video object 402 of the interactive video 404 using the control point 402, the video object detecting apparatus 400 may retrieve a frame containing the most similar object to the video object 402.

Hereinafter, an operation of the video object detecting apparatus 400 will be described in reference to a case where the object retrieval unit 410 retrieves the video object as the video object skeleton.

The object retrieval unit 410 may retrieve the video object as the video object skeleton from the interactive video 404.

The tracking unit 420 may retrieve a joint corresponding to a hand of the user 401 from the video object skeleton. In addition, the tracking unit 420 may track the retrieved joint to the position of the control point 402.

The moment of the video object skeleton may be expressed by Equation 6 as follows.

$$F(t, i) = \frac{1}{n} \sum_{joint=1}^{n} S_n(t, i) \qquad \text{Equation 6}$$

The calculation unit 430 may calculate the difference between the moment of the video object skeleton and the position of the control point 402, based on the identification of the video object skeleton and the position of the control point 402.

The frame extraction unit 440 may extract the frame having the smallest difference calculated from the interactive video 404 by Equation 7 shown below.

$$t^* = \mathrm{argmin}_{\{t \in T(S)\}} \|p - F(t,i)\| \qquad \text{Equation 7}$$

In Equation 7 above, p denotes the position of the control point 402.

Figure 5:
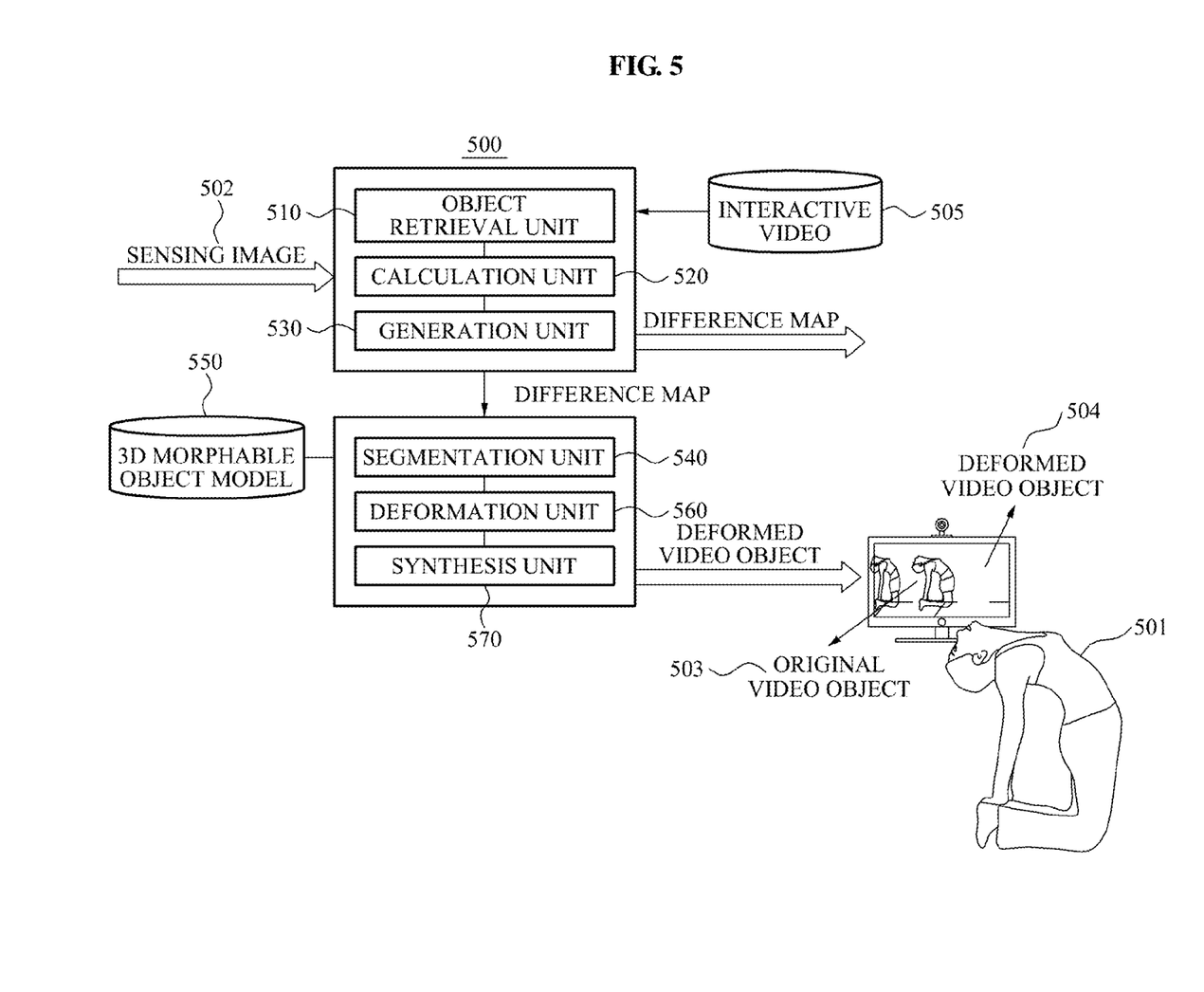
FIG. 5 illustrates a structure of a video object deforming apparatus according to example embodiments.

FIG. 5 illustrates a structure of a video object deforming apparatus 500 according to example embodiments.

Referring to FIG. 5, the video object deforming apparatus 500 includes an object retrieval unit 510, a calculation unit 520, and a generation unit 530.

The object retrieval unit 510 may retrieve a sensing object from a sensing image 502 related to a user 501. That is, the object retrieval unit 510 may retrieve the sensing object form representing the user 501 from the sensing image 502.

Depending on embodiments, the object retrieval unit 510 may retrieve the sensing object from the sensing image 502 by a model-based tracking method.

Depending on embodiments, the object retrieval unit 510 may retrieve the video object from the sensing image 502 as a video object skeleton in a skeleton form. Alternatively, the object retrieval unit 510 may retrieve the video object from the sensing image 502 as a sensing object shape representing a shape of the video object.

The object retrieval unit 510 may retrieve a video object from an interactive video 505. That is, the object retrieval unit 510 may retrieve an object such as a video image of a person or a thing from the interactive video 505.

Depending on embodiments, the object retrieval unit 510 may retrieve the video object from the interactive video 505 by the model-based tracking method.

Depending on embodiments, the object retrieval unit 510 may retrieve the video object as the video object skeleton in the skeleton form, from the interactive video 505. Alternatively, the object retrieval unit 510 may retrieve the video object as the video object shape representing a shape of the video object, from the interactive video 505.

The calculation, unit 520 may calculate a difference between an object shape related to the sensing object and a depth image related to the video object.

The generation unit 530 may generate a difference map based on the calculated difference. That is, the difference map may express a difference between the video object and the sensing object.

According to example embodiments, the video object deforming apparatus 500 may further include a segmentation unit 540, a database (DB) 550, and a deformation unit 560.

The segmentation unit 540 may segment a color video object from a color image related to the video object, based on the depth image related to the video object.

The DB 550 may store a 3D morphable object model.

The deformation unit 560 may deform the video object based on the generated difference map, the segmented color video object, and the 3D morphable object model stored in the DB 550.

The deformation unit 560 may deform the color video object with respect to the 3D morphable object model stored in the DB 550. In addition, the deformation unit 560 may perform 3D model deformation with respect to the textured 3D morphable object model, based on the generated difference map. Furthermore, the deformation unit 560 may deform the video object by performing 2D projection with respect to the 3D morphable object model passed through the 3D model deformation.

The video object deforming apparatus 500 may further include a synthesis unit 570.

The synthesis unit 570 may synthesize the deformed video object with the interactive video 505. Accordingly, the user 501 may be provided with not only an original video object 503 before the deformation, but also a deformed video object 504 to which the difference between the video image of the user 501 and the original video object 503 is reflected.

Figure 6:
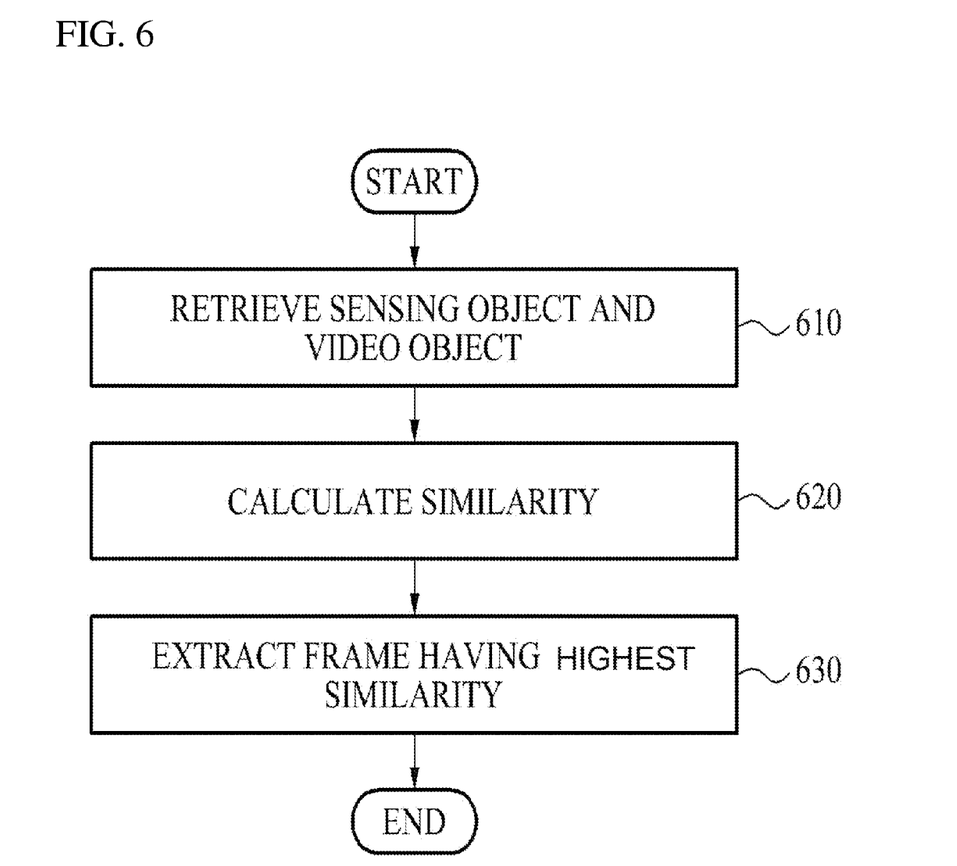
FIG. 6 illustrates a video object detecting method according to example embodiments.

FIG. 6 illustrates a video object detecting method according to example embodiments.

Referring to FIG. 6, in operation 610, the video object detecting method may retrieve a sensing object from a sensing image and also retrieve a video object from an interactive video.

According to example embodiments, the video object detecting method may retrieve the sensing object from the sensing image related to a user. That is, the video object detecting method may retrieve an object representing the user from the sensing image.

Depending on embodiments, the video object detecting method may retrieve the sensing object from the sensing image by a model-based tracking method.

Depending on embodiments, the video object detecting method may retrieve the sensing object as a sensing object skeleton having a skeleton form from the sensing image. Depending on embodiments, the video object detecting method may retrieve the sensing object as a sensing object shape representing a shape of the video object, from the sensing image.

The video object detecting method may retrieve the video object from the interactive video. More specifically, the video object detecting method may retrieve an object such as a video image of a person or a thing from the interactive video.

Depending on embodiments, the video object detecting method may retrieve the video object from the interactive video by the model-based tracking method.

Depending on embodiments, the video object detecting method may retrieve the video object as the video object skeleton in the skeleton form, from the interactive video. Alternatively, the video object detecting method may retrieve the video object as the video object shape representing a shape of the video object, from the interactive video.

In operation 620, the video object detecting method may calculate similarity between the sensing object and the video object.

In operation 630, the video object detecting method may extract a frame, having a highest similarity, from the interactive video. Accordingly, the frame containing an object most similar to the video image of the user may be extracted from the interactive video.

As an example, the video object detecting method may output the extracted frame. Further to the example, a video reproducing apparatus may reproduce the extracted frame.

Hereinafter, an operation according to the video object detecting method will be described about a case where the sensing object is retrieved as a sensing object skeleton and the video object is retrieved as a video object skeleton.

The video object detecting method may retrieve the sensing object as the sensing object skeleton from the sensing image.

Here, the sensing object skeleton may include an n-number of joints located in positions satisfying Equation 1-2 shown below.

$$J_{k, 1 \leq k \leq n} \qquad \text{Equation 1-2}$$

In addition, the video object detecting method may retrieve the video object as the video object skeleton from the interactive video Here, each frame t belonging to a total duration T of the interactive video may be expressed by Equation 2-2 as follows.

$$t \in T(S_k) \qquad \text{Equation 2-2}$$

Here, the video object skeleton stored in the frame t of the interactive video may include an n-number of joints located in positions satisfying Equation 3-2 below.

$$S_{k, 1 \leq k \leq n}(t) \qquad \text{Equation 3-2}$$

The video object detecting method may calculate similarity between the sensing object and the video object using Equation 4-2 below.

$$D(t) = \sum_{joint=1}^{n} \|(J_n - S_n(t))\| \qquad \text{Equation 4-2}$$

The video object detecting method may extract a frame that minimizes D(t) in Equation 4-2 to have a highest-similarity frame using Equation 5-2 below.

$$t^* = \operatorname{argmin}_{\{6 \in T(S)\}} D(t) \qquad \text{Equation 5-2}$$

Figure 7:
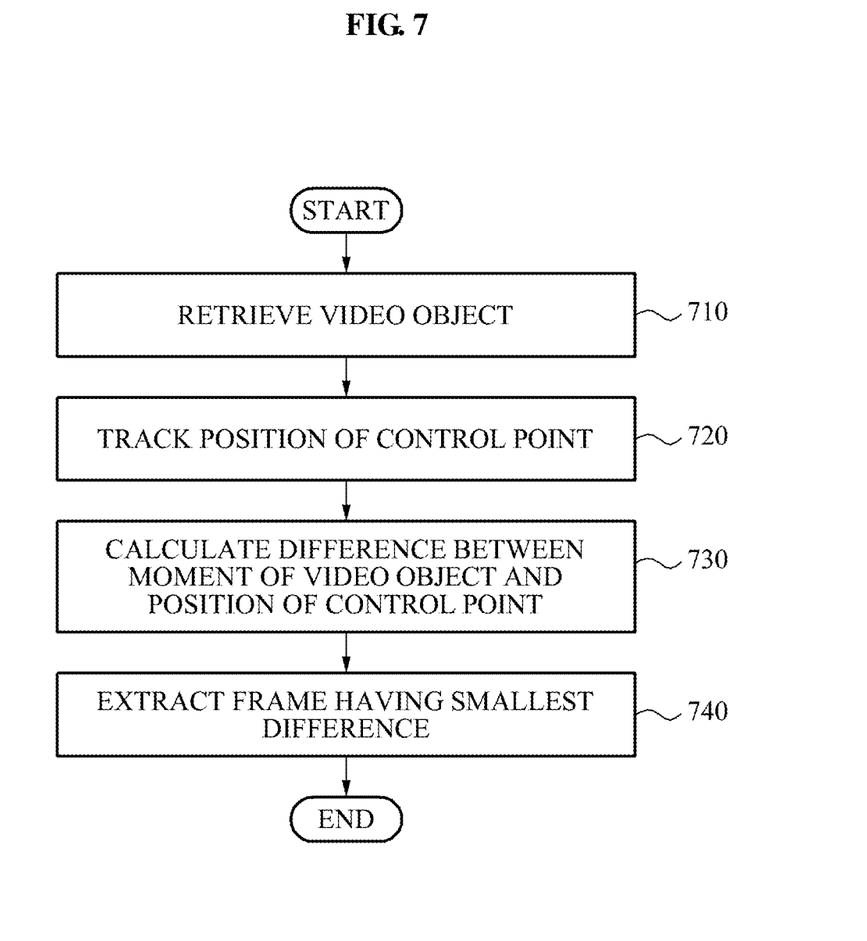
FIG. 7 illustrates a video object detecting method according to other example embodiments.

FIG. 7 illustrates a video object detecting method according to other example embodiments.

Referring to FIG. 7, the video object detecting method may retrieve a video object from an interactive video in operation 710. Depending on embodiments, the video object may include its own ID.

In operation 720, the video object detecting method may track a position of a control point for controlling the video object input by a user.

Parts of a human body, such as a hand, a face, or a foot, for example, may be set as the control point.

In operation 730, the video object detecting method may calculate a difference between a moment of the video object and the position of the control point, based on an identification of the video object and the position of the video object.

In operation 740, the video object detecting method may extract a frame having the smallest difference calculated from the interactive video.

Therefore, when the user wants to move the video object of the interactive video using the control point, the video object detecting method may retrieve a frame containing a most similar object to the video object.

Hereinafter, an operation according to the video object detecting method will be described in reference to a case where the video object is retrieved as the video object skeleton.

The video object detecting method may retrieve the video object as the video object skeleton from the interactive video.

For example, the video object detecting method may retrieve joints corresponding to a hand of the user from the video object skeleton. In addition, the video object detecting method may track the retrieved joint to the position of the control point.

The moment of the video object skeleton may be expressed by Equation 6-2 as follows.

$$F(t, i) = \frac{1}{n} \sum_{joint=1}^{n} S_n(t, i)$$ Equation 6-2

The video object detecting method may calculate the difference between the moment of the video object skeleton and the position of the control point, based on the identification of the video object skeleton and the position of the control point.

The video object detecting method may extract the frame having the smallest difference calculated from the interactive video by Equation 7-2 below.

$$t^* = \operatorname{argmin}_{\{t \in T(S)\}} \|p - F(t,i)\|$$ Equation 7-2

In Equation 7-2 above, p denotes the position of the control point.

Figure 8:
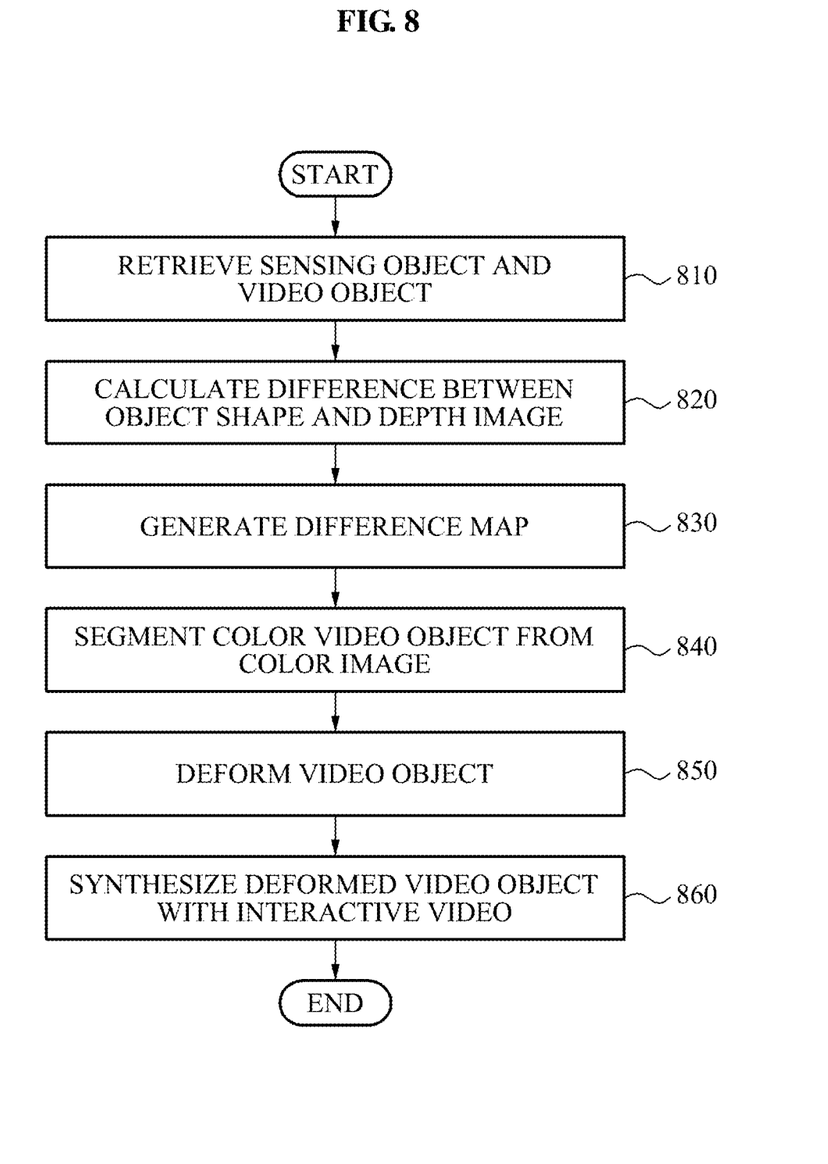
FIG. 8 illustrates a video object deforming method according to example embodiments.

FIG. 8 illustrates a flowchart showing a video object deforming method according to example embodiments.

Referring to FIG. 8, the video object deforming method may retrieve a sensing object from a sensing image and retrieve a video object from an interactive video in operation 810.

The video object deforming method may retrieve the sensing object from the sensing image related to a user. More specifically, the video object deforming method may retrieve an object representing a user from the sensing image.

Depending on embodiments, the video object deforming method may retrieve the sensing object from the sensing image by a model-based tracking method.

Depending on embodiments, the video object deforming method may retrieve the sensing object from the sensing image as the sensing object skeleton in a skeleton form. Alternatively, the video object deforming method may retrieve the video object as the video object shape representing the shape of the video object, from the interactive video 303.

The video object detecting method may retrieve the video object from the interactive video. That is, the video object detecting method may retrieve an object such as a video image of a person or a thing from the interactive video.

Depending on embodiments, the video object detecting method may retrieve the video object from the interactive video by the model-based tracking method.

Depending on embodiments, the video object detecting method may retrieve the video object as the video object skeleton in the skeleton form, from the interactive video. Alternatively, the video object detecting method may retrieve the video object as the video object shape representing a shape of the video object, from the interactive video.

In operation 820, the video object deforming method may calculate a difference between an object shape related to the sensing object and a depth image related to the video object.

In operation 830, the video object deforming method may generate a difference map based on the calculated difference. That is, the difference map may express a difference between the video object and the sensing object.

The video object deforming method may further include segmenting a color video object from a color image and deforming the video object.

Based on the depth image related to the video object, the video object deforming method may segment the color video object from the color image related to the video object in operation 840.

In addition, in operation 850, the video object deforming method may deform the video object based on the generated difference map, the segmented color video object, and a 3D morphable object model stored in the DB.

The video object deforming method may texture the color video object with respect to the 3D morphable object model stored in the DB. In addition, the video object deforming method may perform 3D model deformation with respect to the textured 3D morphable object model, based on the generated difference map. Furthermore, the video object deforming method may deform the video object by performing a 2D projection with respect to the 3D morphable object model passed through the 3D model deformation.

As shown in operation 860, the video object deforming method may further include synthesizing the deformed video object with the interactive video.

Accordingly, the video object deforming method may be provided with not only an original video object before the deformation but also a deformed video object to which the difference between an image of the user and the original video object is reflected.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. The media may be transfer media such as optical lines, metal lines, or waveguides including a carrier wave for transmitting a signal designating the program command and the data construction. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A video object detecting apparatus comprising:
at least one processor and a memory configured to:
retrieve a sensing object, comprising a posture of a user, from a sensing image;
retrieve video objects from video frames from an interactive video, wherein each of the video objects is associated with one of the video frames;
calculate similarity between the posture of the user from the sensing object and each of the video objects;
extract a highest similarity video frame, from the video frames of the interactive video, having a highest similarity to the posture of the user from the sensing object, and
deform a video object associated with the extracted highest similarity video frame based on the extracted highest similarity video frame.

2. The apparatus of claim 1, wherein the at least one processor is further configured to retrieve the posture of the user from the sensing object from at least one of the sensing image and the interactive video by a model-based tracking method.

3. The apparatus of claim 1, wherein the at least one processor is further configured to retrieve the posture of the user from the sensing object from at least one of the sensing image and the interactive video as a video object skeleton in skeleton form.

4. The apparatus of claim 1, wherein the at least one processor is further configured to retrieve the posture of the user from the sensing object from at least one of the sensing image and the interactive video as a sensing object shape representing a shape of the video object.

5. The apparatus of claim 1, wherein the at least one processor is further configured to retrieve the video objects based on a video image of a person or a thing from the video frames of the interactive video.

6. The apparatus of claim 1, wherein the at least one processor is further configured to retrieve the video objects based on applying a model-based tracking on the video frames of the interactive video.

7. The apparatus of claim 1, wherein the highest similarity video frame, from the video frames of the interactive video, having a highest similarity to the posture of the user from the sensing object is based on the similarity of at least one of the video objects and posture of the user.

8. The apparatus of claim 1, wherein the at least one processor is further configured to reproduce a portion of the interactive video based on the highest similarity video frame.

9. A video object detecting method comprising:
retrieving a sensing object, comprising the posture of a user, from a sensing image;
retrieving video objects from video frames from an interactive video, wherein each of the video objects is associated with one of the video frames;
calculating, by a processor, similarity between the posture of the user from the sensing object and each of the video objects;
extracting a highest similarity video frame, from the video frames of the interactive video, having an object most similar to the posture of the user from the sensing object, and
deforming a video object associated with the extracted highest similarity video frame based on the extracted highest similarity video frame.

10. A non-transitory computer readable recording medium storing a program to cause a computer to implement the method of claim 9.

11. The method of claim 9, wherein the retrieving the video objects is based on a video image of a person or a thing from the video frames of the interactive video.

12. The method of claim 9, wherein the retrieving the video objects is based on applying model-based tracking on the video frames of the interactive video.

13. The method of claim 9, wherein the highest similarity video frame, from the video frames of the interactive video, having a highest similarity to the sensing object is based on the similarity of at least one of the video objects and the user.

14. The method of claim 9, further comprising reproducing a portion of the interactive video based on the highest similarity video frame.

15. The method of claim 9, wherein the retrieving the sensing object from the sensing image comprises retrieving the sensing object in skeleton form.

16. The method of claim 9, wherein the retrieving the video objects from video frames comprises retrieving the video objects in skeleton form.

17. A system for utilizing an interactive video comprising:
a video object detecting apparatus comprising:
at least one processor and a memory configured to:
retrieve a sensing object, comprising the posture of the user, from a sensing image; and also configured to
retrieve video objects from video frames from an interactive video, wherein each of the video objects is associated with one of the video frames;
calculate similarity between the posture of the user from the sensing object and each of the video objects;
extract a highest similarity video frame, from the video frames of the interactive video, having a highest similarity to the posture of the user from the sensing object; and
a video object deforming apparatus configured to, using the at least one processor, deform a video object associated with the extracted highest similarity video frame based on the extracted highest similarity video frame.

18. The system of claim 17, wherein the video object deforming apparatus comprises:
the at least one processor, which is further configured to:
retrieve the sensing object from a sensing image related to a user, and also retrieve the video object from the highest similarity video frame,
calculate a difference between an object shape related to the sensing object and a depth image related to the video object, and
generate a difference map based on the calculated difference, wherein the deformation of the video object based on the extracted highest similarity video frame comprises deforming the video object based on the difference map.

* * * * *